US008462929B1

(12) United States Patent
Soroushnejad et al.

(10) Patent No.: US 8,462,929 B1
(45) Date of Patent: *Jun. 11, 2013

(54) SYSTEM, METHOD, AND COMPUTER PROGRAM PRODUCT FOR STORING DATA ASSOCIATED WITH ORIGINATION PROCESSING OF A CALL

(75) Inventors: Mohsen Soroushnejad, San Jose, CA (US); Venkatesh Venkataramanan, Campbell, CA (US); Suresh M. Srinivasa Rao, Sunnyvale, CA (US); John E. Franklin, Cupertino, CA (US)

(73) Assignee: BroadSoft, Inc., Gaithersburg, MD (US)

( * ) Notice: Subject to any disclaimer, the term of this patent is extended or adjusted under 35 U.S.C. 154(b) by 1352 days.

This patent is subject to a terminal disclaimer.

(21) Appl. No.: 11/833,091

(22) Filed: Aug. 2, 2007

(51) Int. Cl.
*H04M 3/42* (2006.01)

(52) U.S. Cl.
USPC .............. 379/201.02; 379/159; 455/432.3

(58) Field of Classification Search
USPC .......... 379/114.01, 114.05, 159, 160, 201.01, 379/201.02, 220.01, 225, 233; 370/259, 352; 455/432.3
See application file for complete search history.

(56) References Cited

U.S. PATENT DOCUMENTS

| | | | |
|---|---|---|---|
| 6,252,952 B1 * | 6/2001 | Kung et al. | 379/114.1 |
| 6,628,937 B1 * | 9/2003 | Salin | 455/413 |
| 6,751,483 B1 | 6/2004 | Oh | 455/566 |
| 6,996,217 B2 | 2/2006 | Goldman | 379/142.01 |
| 7,801,953 B1 * | 9/2010 | Denman et al. | 709/204 |
| 8,280,024 B1 | 10/2012 | Soroushnejad et al. | |
| 2003/0147519 A1 | 8/2003 | Jain et al. | 379/211.02 |
| 2003/0224722 A1 | 12/2003 | Martin et al. | |
| 2004/0120494 A1 | 6/2004 | Jiang et al. | 379/210.01 |
| 2004/0122810 A1 | 6/2004 | Mayer | 707/3 |
| 2005/0175172 A1 | 8/2005 | Janssen | 379/440 |
| 2006/0043164 A1 | 3/2006 | Dowling et al. | 235/375 |
| 2006/0083220 A1 | 4/2006 | Mekala et al. | 370/352 |
| 2006/0094466 A1 | 5/2006 | Tran | 455/558 |
| 2006/0104428 A1 | 5/2006 | Jin | 379/142.01 |
| 2006/0291639 A1 | 12/2006 | Radziewicz et al. | 379/211.01 |

FOREIGN PATENT DOCUMENTS

WO WO 00/05905 2/2000

OTHER PUBLICATIONS

"Personal Ring Back Tones," Cantata Technology, Inc., Needham, MA, 2006.
Final Official Action for U.S. Appl. No. 11/833,114 (May 5, 2011).
Non-Final Official Action for U.S. Appl. No. 11/833,114 (Oct. 20, 2010).
Notice of Allowance and Fee(s) Due for U.S. Appl. No. 11/833,114 (Jul. 17, 2012).
Non-Final Official Action for U.S. Appl. No. 11/833,114 (May 8, 2012).

* cited by examiner

*Primary Examiner* — Antim Shah
(74) *Attorney, Agent, or Firm* — Jenkins, Wilson, Taylor & Hunt, P.A.

(57) ABSTRACT

A system, method, and computer program product are provided for storing data associated with origination processing of a call. In use, a call is initiated from a first party to a second party. Further, it is determined whether the first party and the second party are members of a group. Still yet, data associated with origination processing is stored if it is determined that the first party and the second party are members of a group.

19 Claims, 7 Drawing Sheets

SYSTEM, METHOD, AND COMPUTER PROGRAM PRODUCT FOR STORING DATA ASSOCIATED WITH ORIGINATION PROCESSING OF A CALL

FIELD OF THE INVENTION

The present invention relates to telecommunication systems, and more particularly to call processing utilizing telecommunication systems.

BACKGROUND

Telecommunication systems customarily utilize telephony applications for processing calls initiated therein. However, in use, such applications traditionally process originating calls associated with an initiator of a call separate from terminating calls associated with a receiver of the call. As a result, various limitations are associated with such separate call processing. Just by way of example, call data associated with the originating call processing has generally been inaccessible during the terminating call processing, of the call.

As shown in the prior art telecommunication system 100 of FIG. 1, a first party 102 is coupled with an originating server 104. In response to receipt of a request from the first party 102 to initiate a call to a second party 110, the originating server 104 receives data associated with the first party 102 from a database 112, and routes an originating call request with such data to an application server 106. In turn, the application server 106 processes the originating call request utilizing the data associated with the first party 102.

Further, the originating server 104 forwards the call to a terminating server 108 based on such processed originating call request. In response to receipt of the terminating server 108 receives data associated with the second party 110 from the database 112, and routes a terminating call request with such data to the application server 106. Additionally, the application server 106 processes the terminating call request utilizing the data associated with the second party 110, such that the call may be routed to the second party 110 based on such processing.

Thus, as shown, the application server 106 processes the originating, call request and the terminating call request separately. Accordingly, when the application server 106 processes the terminating call request, it does not have access to call data associated with the originating call processing. There is thus a need for addressing these and/or other issues associated with the prior art.

SUMMARY

A system, method, and computer program product are provided for storing data associated with origination processing of a call. In use, a call is initiated from a first party to a second party. Further, it is determined whether the first party and the second party are members of a group. Still yet, data associated with origination processing is stored if it is determined that the first party and the second party are members of a group.

DETAILED DESCRIPTION

Figure 1:
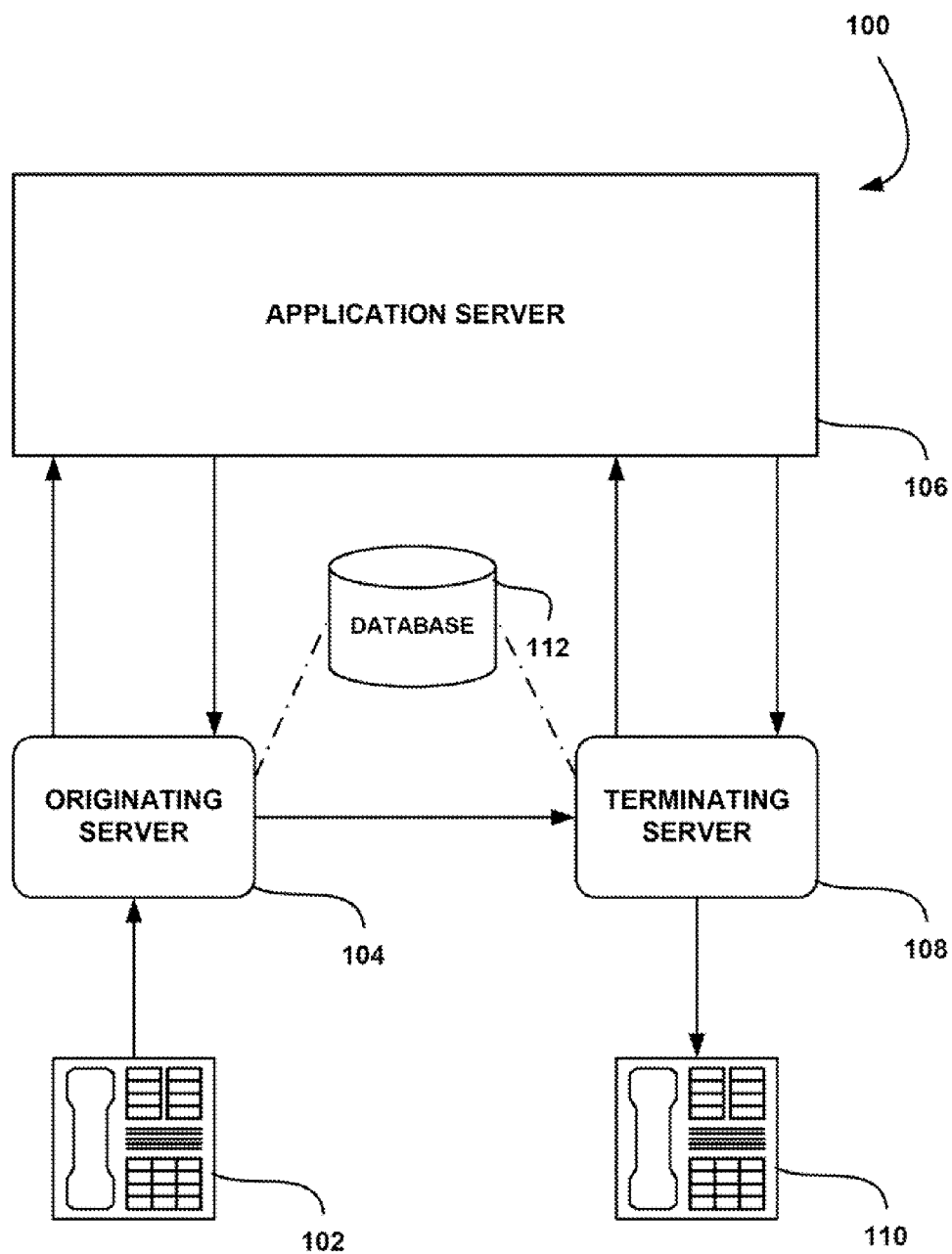
FIG. 1 illustrates a telecommunication system, in accordance with the prior art.
Figure 2:
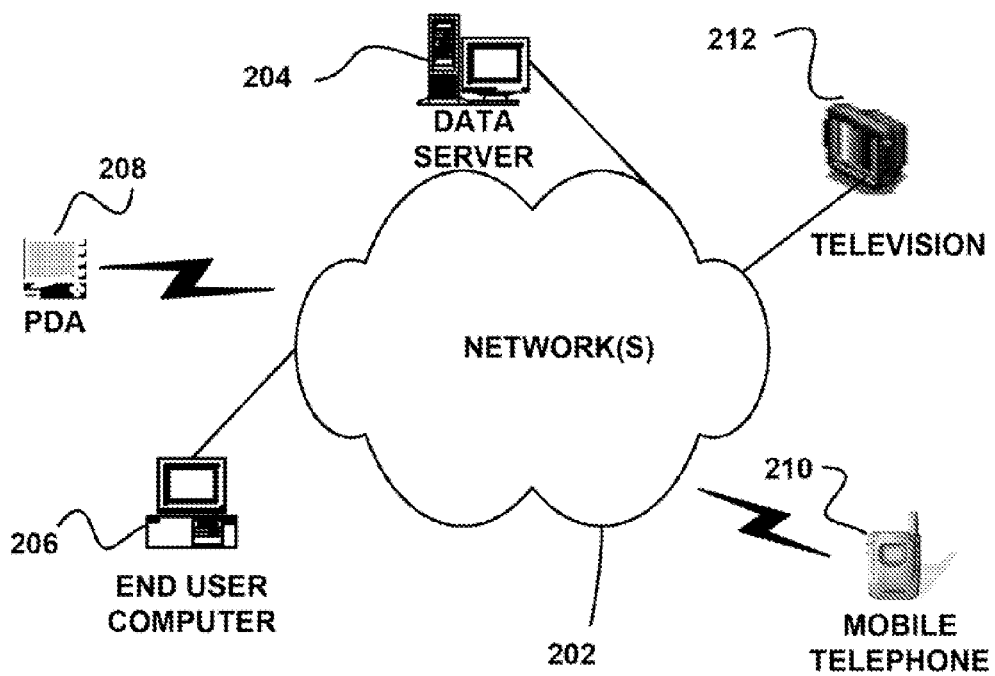
FIG. 2 illustrates a network architecture, in accordance with one embodiment.

FIG. 2 illustrates a network architecture 200, in accordance with one embodiment. As shown, at least one network 202 is provided. In the context of the present network architecture 200, the network 202 may take any form including, but not limited to a telecommunications network, a local area network (LAN), a wireless network, a wide area network (WAN) such as the Internet peer-to-peer network, cable network, etc. While only one network is shown, it should be understood that two or more similar or different networks 202 may be provided.

Coupled to the network 202 is a plurality of devices. For example, a server computer 204 and an end user computer 206 may be coupled to the network 202 for communication purposes. Such end user computer 206 may include a desktop computer, lap-top computer, and/or any other type of logic. Still yet, various other devices may be coupled to the network 202 including a personal digital assistant (PDA) device 208, a mobile phone device 210, a television 212, etc.

Figure 3:
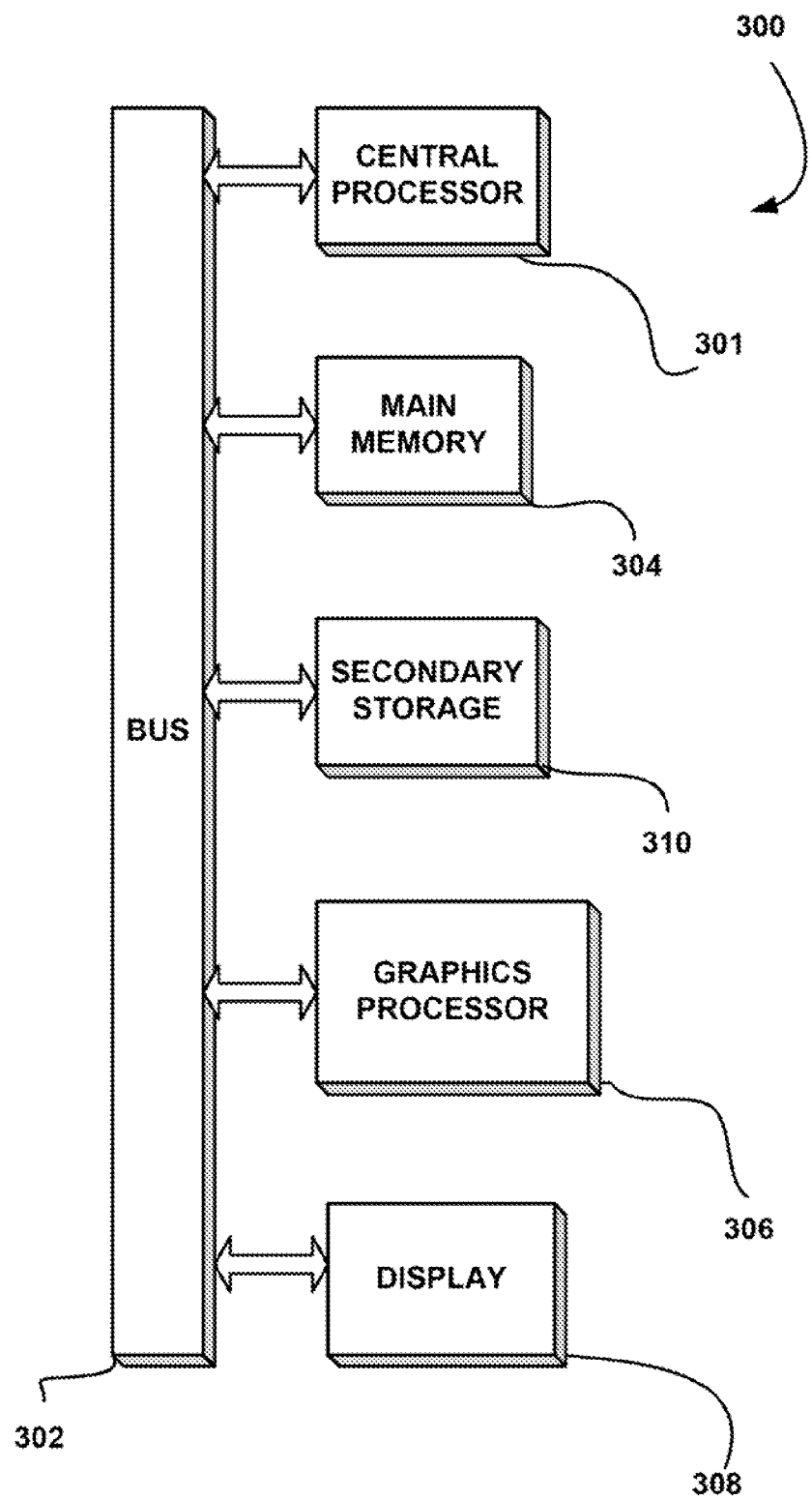
FIG. 3 illustrates an exemplary system, in accordance with another embodiment.

FIG. 3 illustrates an exemplary system 300, in accordance with another embodiment. As an option, the system 300 may be implemented in the context of any of the devices of the network architecture 200 of FIG. 2. Of course, the system 300 may be implemented in any desired environment.

As shown, a system 300 is provided including at least one central processor 301 which is connected to a communication bus 302. The system 300 also includes main memory 304 [e.g. random access memory (RAM), etc.]. Strictly as an option, the system 300 may also include a graphics processor 306 and a display 308.

The system 300 may also include a secondary storage 310. The secondary storage 310 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 304 and/or the secondary storage 310. Such computer programs, when executed, enable the system 300 to perform various functions (to be set forth below, for example). Memory 304, storage 310 and/or any other storage are possible examples of computer-readable media.

Figure 4:
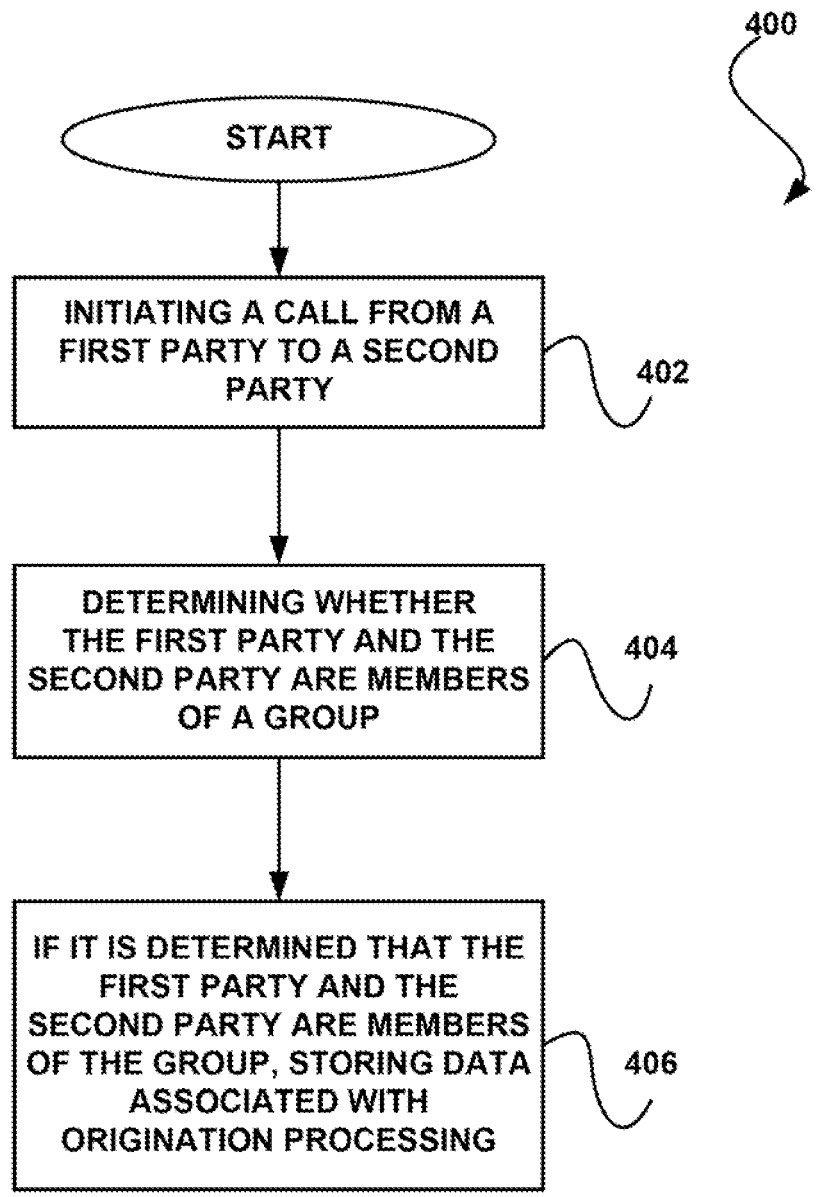
FIG. 4 illustrates a method for storing data associated with origination processing of a call, in accordance with yet another embodiment.

FIG. 4 shows a method 400 for storing data associated with origination processing of a call, in accordance with another embodiment. As an option, the method 400 may be carried out in the context of the details of FIGS. 2 and/or 3. Of course, however, the method 400 may be carried out in any desired environment. Further, the aforementioned definitions may equally apply to the description below.

As shown in operation 402, a call is initiated from a first party to a second party. In one embodiment, the first party may be as calling party, and the second party may be a called party. For example, the first party may be an initiator of a call, and the second party may be a receiver of such call. In various embodiments, the call may include a video call, an audio call, a voice call, a message, and/or any other communication session capable of being initiated from a first party to a second party.

In addition, the call may optionally be initiated over a network (e.g. such as any of the networks described above with respect to FIG. 2, etc.). To this end, the first party and the second party may be located on the network. Further, the call may be initiated from the first party to the second party by any manner utilizing software, hardware, etc. Just by way of example, software associated with the first party may initiate a call to hardware associated with the second party, etc.

In the context of software via which the call may be initiated, such software may include a software driver, an application, an operating system, etc. Optionally, such application may include a network based application such as a network browser, a web browser, an electronic mail (email) application, and/or any other application capable of initiating a call over a network.

In another embodiment, the software may include a web portal. For example, the web portal may include an application capable of accessing various information located on the network. To this end, the call may be issued by the first party via the web portal.

Still yet, in the context of hardware via which the call may be initiated, such hardware may include any of the devices described above with respect to FIGS. 2 and/or 3 (e.g. such as a PDA, an end user computer, a mobile telephone, a television, etc.). In this way, the first party and the second party may be associated with different devices, such that the call may be initiated from one device to another device.

In one embodiment, the call may be initiated manually. For example, the call may be initiated by a user utilizing the software, hardware, etc. In another embodiment, the call may be initiated automatically. For example, the call may be initiated without user interaction (e.g. based on a schedule, a response, etc.) utilizing the software, hardware, etc. Of course, it should be noted that the call may be initiated from the first party to the second party in any desired manner.

Further, in operation 404, it is determined whether the first party and the second party are members of a group. In the context of the present description, the group may include any predefined collection, set, etc. of parties. To this end, various parties may be predetermined to be members of a group.

in one embodiment, determining whether the first party and the second party are members of a group may include determining whether such parties are members of a same group. Furthermore, the determination may be based on information associated with the first party and/or the second party. For example, such information may indicate groups associated with each of such parties.

In one embodiment, the information may include an identifier associated the first party. For example, such identifier may include a source identifier (e.g. location, device identifier, etc.) of the first party. In another embodiment, the information may include an identifier associated with the second party. For example, such identifier may include a destination identifier (e.g. location, device identifier, etc.) of the second party. To this end, identifiers of the first party and/or second party may be utilized for identifying groups to which such parties are members.

Still yet, in another embodiment, the determination may be based on a query of configuration information. Such configuration information may thus indicate a group of the first party and the second party. For example, the configuration information may be configured by an administrator, an application, etc.

Just by way of example, the identifier of the first party and the identifier of the second party, as described above, may be utilized for querying such configuration information. To this end, the configuration information may optionally be stored in at least one database. Accordingly, configuration information for a plurality of parties may be stored in the database in association with identifiers thereof.

Moreover, in response to identifying a group associated with the first party and the second party, such groups may be compared to determine whether there is a match. In this way, it may be determined whether the first party and the second party are members of a group. Of course, it should be noted that it may be determined whether the first party and the second party are members of a group in any desired manner.

Additionally, in one embodiment, the group may be a closed user group. Such closed user group may include a predefined group of parties for which predetermined services are provided. In various embodiments, the services may be predetermined based on a default set of services, administrator defined services, user defined services, etc. For example, the services may include private extension dialing, distinctive ringing (e.g. for incoming calls within or outside the group), an intercom feature, call forwarding, enhanced telephony features and/or any other services capable of being associated with a call. To this end, different groups may be associated with different sets of services.

In addition, if it is determined that the first party and the second party are members of a group, data associated with origination processing is stored. See operation 406. In the context of the present description, the originating processing may include any processing associated with the initiation of the call from the first party. For example, the origination processing may optionally include determining groups associated with the first party and the second party, identifying provided services associated with such groups, etc.

In one embodiment, the data associated with the origination processing may include the set of provided services associated with the group in which the first party and the second party are members. In another embodiment, the data may include any aspect associated with the call (e.g. time, date, etc.). As an option, the data may be stored in a data structure.

Furthermore, an identifier may be associated with the data, assigned to the data, etc. In one embodiment, the identifier may include a globally unique identifier. For example, the globally unique identifier may be based on information associated with the call, a random sequence, a media access control (MAC) address, a message-digest algorithm 5 (MD5) hash, a secure hash algorithm (SHA) hash, etc. To this end, data associated with origination processing may be stored.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 5:
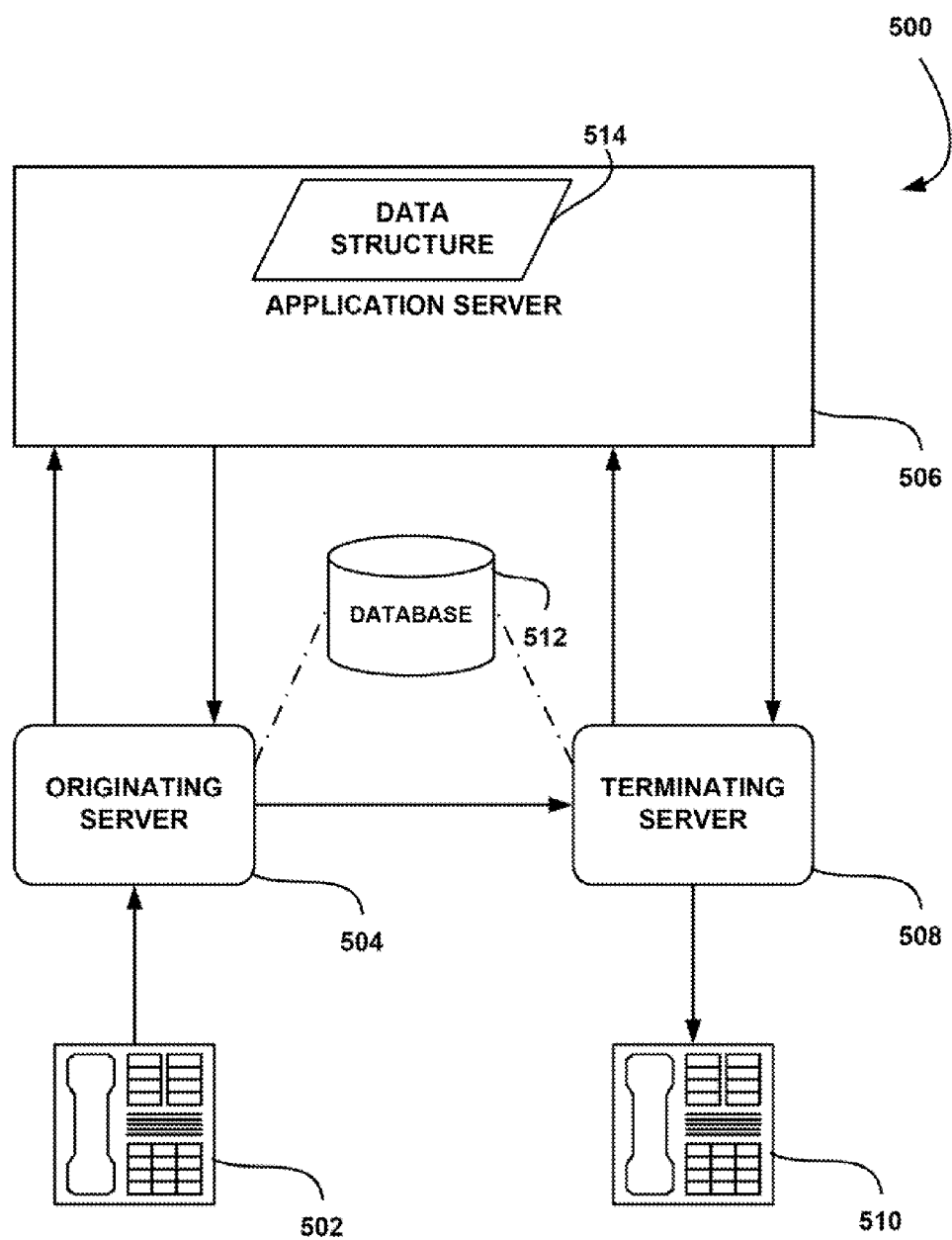
FIG. 5 illustrates a system for storing data associated with origination processing of a call, in accordance with still yet another embodiment.

FIG. 5 illustrates a system 500 for storing data associated with origination processing of a call, in accordance with still yet another embodiment. As an option, the system 500 may be implemented in the context of the details of FIGS. 2-4. Of course, however, the system 500 may be implemented in any desired environment. Further, the aforementioned definitions may equally apply to the description below.

As shown, a first party 502 is in communication with an originating server 504. As an option, the first party 502 may be in communication with the originating server 504 via a network. In various embodiments, the network may include an IP multimedia system (IMS) network, a telecommunications network, etc., but of course may also include any of the networks described above with respect to FIG. 2. In this way, a call may be initiated from the first party 502 to a second party 510 via the originating server 504, utilizing the network.

In one embodiment, the originating server 504 may include a session initiation protocol (SIP) server. Such SIP server may include an application layer control protocol utilized for initiating, creating, modifying, updating, and or terminating sessions with one or more parties. For example, the SIP protocol may be utilized for receiving a voice call [e.g. voice over internet protocol (IP), etc.], a video call, a message, etc. initiated by the first party 502.

Additionally, the SIP server may include a call session control function (CSCF) server, which may be utilized in processing SIP packets in the abovementioned EMS network. Optionally, the CSCF server may further include a proxy-call session control function (P-CSCF) server, a serving-call session control function (S-CSCF) server, an interrogating-call session control function (I-CSCF) server, etc. Further, the SIP server may handle SIP registrations, inspect SIP messages, decide to which application server the SIP message will be forwarded, provide routing services, enforce network policies, provide load balancing with other SIP servers, etc.

In one embodiment, the originating server 504 may register the first party 502 by associating a source address of the first party 502 with a SIP address. In another embodiment, the SIP address may be a uniform resource identifier (URI). For example, the URI may include a tel-uri (e.g. which may include digits), a sip-uri (e.g. which may include alphanumeric identifiers), etc.

Table 1 illustrates two examples of URIs that may be associated with a source address of the first party 502. Of course, it should be noted that such URIs are set forth for illustrative purposes only, and thus should not be construed as limiting in any manner.

TABLE 1

| URI | EXAMPLE |
|---|---|
| tel-uri | tel: +1-555-987-6543 |
| sip-uri | sip: joe.user@domain.com |

In response to a call initiated by the first party 502, the originating server 504 may receive data associated with the first party 502 from a database 512. In one embodiment, the database 512 may include a home subscriber server (HSS) database, but of course may also include any type of database capable of storing data. Additionally, in another embodiment, such data may include any information capable of being associated with the first party 502. For example, the data may include profile information (e.g. location, etc.) associated with the first party 502. As another option, the data may identify an application server 506 (e.g. SIP application server, etc.) associated with the first party 502 for processing calls initiated thereby, etc.

In another embodiment, the data may include filter criteria. For example, the filter criteria may include rules for determining whether to communicate an originating call request associated with the initiated call to the application server 506 for processing. Optionally, the filter criteria may be user-configured and/or automatically configured (e.g. based on identified trends in network communication, etc.). In this way, the originating server 504 may determine whether to communicate the originating call request associated with the initiated call to the application server 506 based on the data in the database 512.

Thus, the originating server 504 may route the originating call request associated with the initiated call from the first party 502 to the application server 506 for processing thereof. Such originating call request may include a request for the call from the first party 502 to be set up. For example, the call may be set up by enabling services (e.g. private extension dialing, distinctive ringing, etc.) that may be utilized with respect to the call. Moreover, the originating, call request may include information identifying the first party 502 (e.g. utilizing a source address associated with the initiated call) and/or the second party 510 to which the call was initiated (e.g. utilizing a called destination address associated with the initiated call). Optionally, such party identification information may be obtained based on data received by the originating server 504 from the database 512.

Accordingly, the application server 506 may perform originating processing upon the originating call request. Such originating processing may include utilizing the first party identification information and the second party identification information to determine if the first party 502 and the second party 510 are members of a group.

In one embodiment, the application server 506 may analyze the identity of the first party 502 and the second party 510 for determining whether such parties are members of a group. In another embodiment, the application server 506 may query a database of configuration information for determining whether the first party 502 and the second party 510 are members of a group. For example, such configuration information may indicate groups associated with various parties. Thus, as an option, identifiers of the first party 502 and the second party 510 may be utilized for querying the database of configuration information for groups associated therewith.

In one embodiment, the database of configuration information may be included in (e.g. local to) the application server 506. In another optional embodiment, the database of configuration information may be remotely located with respect to the application server 506. For example, the database of configuration information may be stored on another server in communication with the application server 506 via, the network.

Table 2 illustrates one example of a database of configuration information. It should be noted that such database is set forth for illustrative purposes only, and thus should not be construed as limiting in any manner.

TABLE 2

| PARTY | GROUP IDENTIFIER |
|---|---|
| PARTY_01 | GROUP_01 |
| PARTY_02 | GROUP_02 |
| PARTY_03 | GROUP_01 |

If it is determined that the first party 502 and second party 510 are members of a group, data associated with the originating processing may be stored. As shown, the data is stored in a data structure 514, such as a table, a log file, a database, etc. Moreover, the data may include any data associated with the processing of the originating call request. Just by way of example, the data may include a time of the initiated call, a source of the call, a destination of the call, a group associated with the first party 502 and the second party 510, services associated with the group of the first party 502 and the second party 510, etc.

Further, in another embodiment, the data may be stored in the data structure 514 in association with a unique identifier. Such unique identifier may optionally be based on information associated with the call. For example, the unique identifier may include a globally unique identifier included in the originating call request, such as for example, a SIP header of such request. As another example, the unique identifier may include an IMS charging identity (ICID) from a p-charging vector header. In one embodiment, the charging vector may be a collection of charging information related to the call.

Still yet, the group to which the first party 502 and the second party 510 belong may be associated with a predetermined set of provided services. Thus, the application server 506 may provide such services to the first party 502 via the originating server 504 for use during the call. In one embodiment, the application server 506 may add the unique identifier associated with the data stored in the data structure 514 to the originating call request, but of course the unique identifier may already exist in the originating call request before originating processing, as described above.

Further, the application server 506 may route the originating call request to the originating server 504 (e.g. via the network). In addition, the originating server 504 ma forward the originating call request to a terminating server 508 (e.g. via the network). Optionally, the terminating server 508 may include an S-CSCF server. Further, the terminating server 508 may be associated with the second party 510.

In one embodiment, the originating server 504 may reside on a home network, and the terminating server 508 may reside on a foreign network. For example, the home network may be the network of the first party 502, and the foreign network may be the network of the second party 510 which is different than the home network. In yet another embodiment, the originating server 504 and the terminating server 508 may reside on the same network. Still yet, in another embodiment, the application server 506 may reside on the home network, but of course may also reside on the foreign network and/or any other network in communication with the network(s) of the originating server 504 and the terminating server 508.

In response to receiving the originating call request, the terminating server 508 may receive data associated with the second party 510 from the database 512. As another option, the terminating server 508 may identify filter criteria in the database 512 for determining whether to route the call request to the application server 506. Thus, the terminating server 508 may determine whether to route a terminating call request to the application server 506 based on the data received from database 512.

To this end, the terminating server 508 may communicate a terminating call request to the application server 506. In one embodiment, the application server 506 may utilize information in the terminating call request to identify if data associated with the call is stored in the data structure 514. For example, the unique identifier included in originating call request issued by the application server 506 may be utilized to identify the data in the data structure 514. Thus, in response to receiving the terminating call request, the stored data associated with the unique identifier may be identified.

If the data associated with the unique identifier exists in the data structure 514, the application server 506 may utilize such data in the data structure 514 to provide group services to the second party 510 during receipt of the call. Further, the application server 506 may route the terminating call request to the terminating server 508 (e.g. via the network). In addition, the terminating server 508 may forward the terminating call request to the second party 510 (e.g. via the network).

Figure 6A:
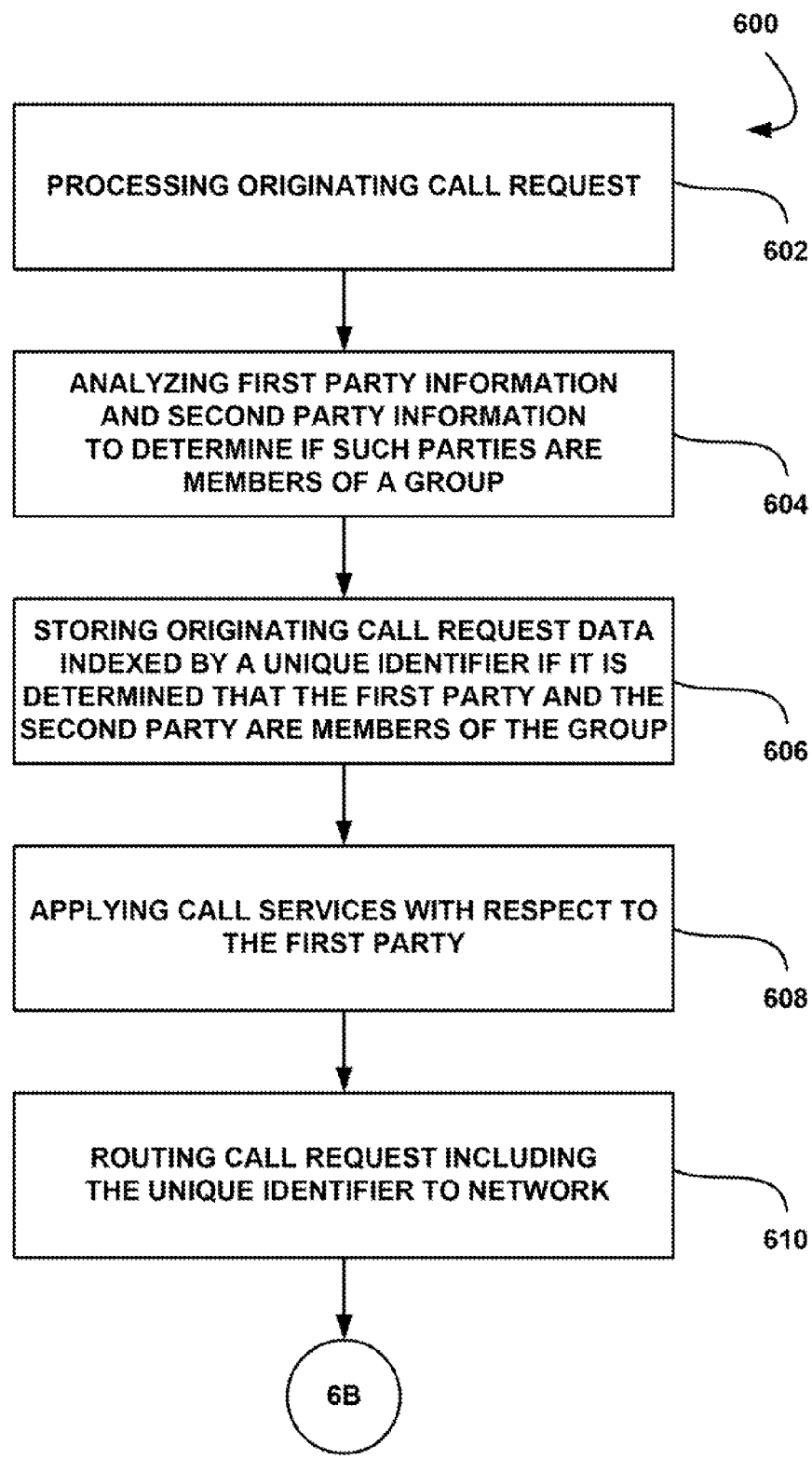
FIG. 6A illustrates a method for processing an originating call request, in accordance with another embodiment.

FIG. 6A illustrates a method 600 for processing an originating call request, in accordance with another embodiment. As an option, the method 600 may be carried out in the context of the details of FIGS. 2-5. Of course, however, the method 600 may be carried out in any desired environment. Further, the aforementioned definitions may equally apply to the description below.

An originating call request is processed. See operation 602. In the context of the present embodiment, the originating call request may be generated in response to initiation of a call by a first party. In one embodiment, the originating call request processing may be performed by an originating server. For example, the originating call request may be filtering by the originating server. As another example, data associated with the originating call request (e.g. source information of the first party, destination information of a second party to which the call is to be received, etc.) may identified by the originating server via a database and may be added to the originating call request.

In another embodiment, the originating call request processing may be performed by an application server. For example, the originating call request may be processed for identifying data (e.g. source information of the first party, destination information of a second party to which the call is to be received, etc.) associated therewith. Of course, however, any other processing may be performed on the originating call request.

Additionally, first party information and second party information are analyzed to determine if such parties are members of a group. See operation 604. For example, the first party information may include an identity of the first party, whereas the second party information may include an identity of the second party. In one embodiment, the first party information and the second party information may be obtained from the originating call request. Further, in another embodiment, the first party information and the second party information ma be obtained from a database.

If it is determined that the first party and the second party are members of a group, originating call request data is stored and indexed by a unique identifier. See operation 606. Such originating call request data may include any data associated with the originating call request. In one embodiment, the unique identifier may be received in association with the originating call request. In another embodiment, the originating call request data may be stored in a data structure on the server.

Additionally, call services are applied with respect to the first party. See operation 608. In one embodiment, the application server may apply the call services. To this end, the application server may provide services utilized in setting up the call for the first party.

Furthermore, a call request including the unique identifier is routed to the network. See operation 610. In one embodiment, the call request ma be routed to an originating server located on the network. For example, such originating server may be associated the first party. As another option, the application server may route the call request to the network. In this way, an originating call request initiated by a first party to a second party may be processed.

Figure 6B:
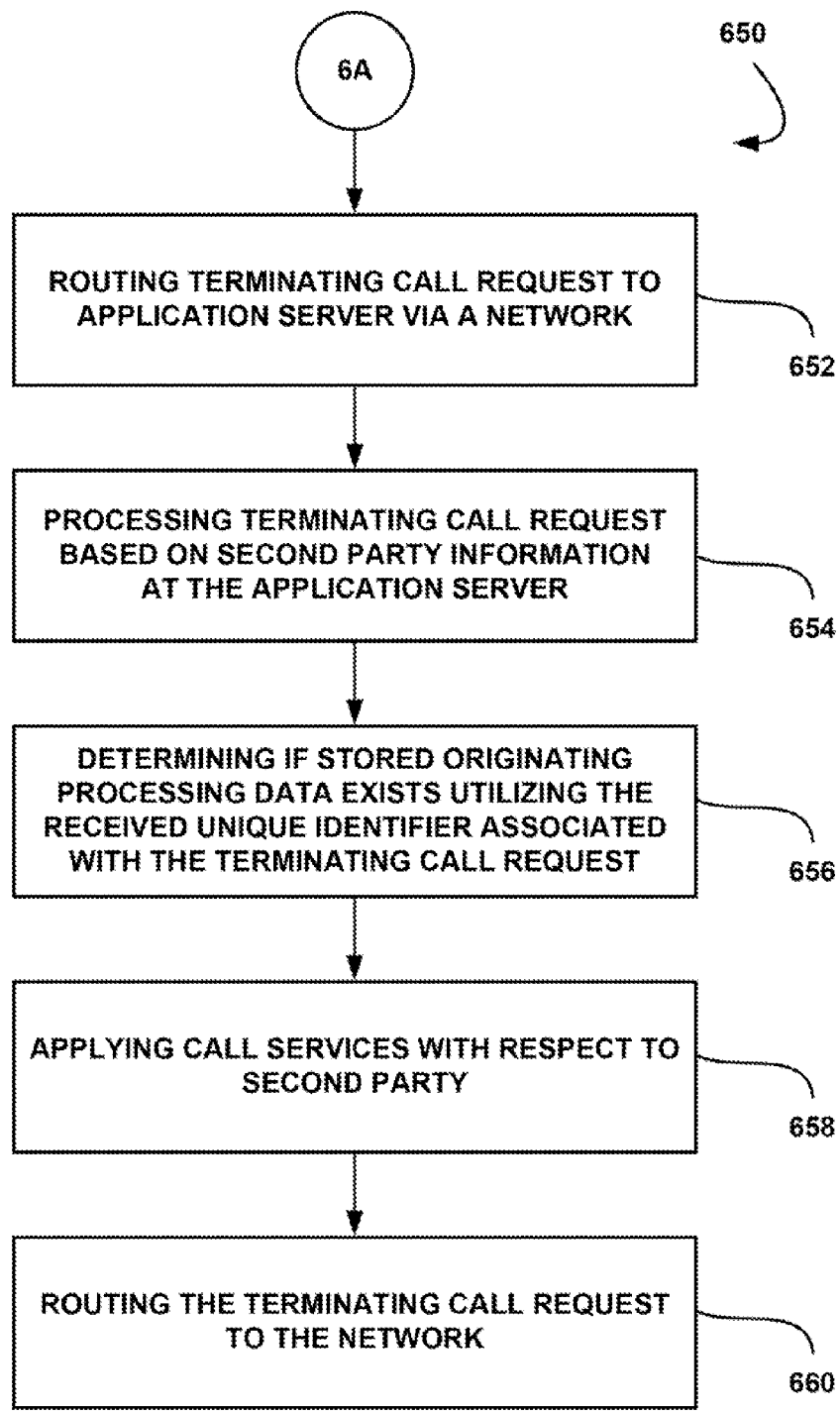
FIG. 6B illustrates a method for processing a terminating, call request, in accordance with yet another embodiment.

FIG. 6B illustrates a method 650 for processing a terminating call request, in accordance with yet another embodiment. As an option, the method 650 may be carried out in the context of the details of FIGS. 2-6A. Of course, however, the method 650 may be carried out in any desired environment. Further, the aforementioned definitions may equally apply to the description below.

As shown, a terminating call request is routed to an application server via a network. See operation 652. In one embodiment, the terminating call request may be routed from a terminating server associated with a second party. In the context of the present description, the second party includes a party to which an initiated call is directed.

In addition, the terminating call request is processed based on second party information. See operation 654. For example, the second party information may include a unique identifier associated with the terminating call request added by an application server during processing of an associated originating call request. In addition, the unique identifier associated with the terminating call request is utilized to determine if stored originating processing data exists. See operation 656. For example, the application server may determine whether the stored call processing data exists for the unique identifier.

Further, call services are applied with respect to the second party. See operation 658. In one embodiment, if the stored originating processing data exists, the application server may utilize the stored data to apply the call services. Furthermore, the terminating call request is routed to the network. See operation 660. In one embodiment, the network may be utilized to route the terminating call request to the second party, in another embodiment, the terminating server may route the terminating call request to the second party via the network.

The following is an example illustrating the aforementioned embodiments described above with respect to FIGS. 6A-6B. In use, a first party initiates a call to a second party. The first party initiates the call by sending a call request to an originating S-CSCF server. Further, the originating S-CSCF server queries a HSS database for information relating to the first party. The HSS database returns filter criteria for the call request, information associated with the first party, and information identifying a SIP application server. Furthermore, the originating S-CSCF server forwards the call request with the information associated with the first party to the identified application server for processing thereof, based on the filter criteria.

The SIP application server receives the information associated with the call request and performs processing upon such information. The processing includes analyzing the information associated with the first party and the information associated with the second party to determine if the parties are members of a group. If the parties are determined to be members of a group, the SIP application server stores information associated with the processing of the call request in a data structure indexed by a globally unique identifier associated with the call request. The SIP application server then applies call services, including group services, with respect to the first party, and forwards the call request, including the globally unique identifier, to the originating S-CSCF server. The originating S-CSCF server then forwards the request to the terminating S-CSCF server via the IMS network.

Furthermore, the terminating S-CSCF server receives the call request, including the globally unique identifier. The terminating S-CSCF server queries a HSS database for information relating to the second party. The HSS database returns information associated with the second party, in addition to information identifying a SIP application server. Furthermore, the terminating S-CSCF server forwards the call request with the information associated with the second party to the identified SIP application server for processing thereof.

In response, the SIP application server performs processing upon the call request. The SIP application server utilizes the globally unique identifier from the call request to determine if the stored data associated with the originating processing exists. If the stored data exists, the SIP application server then applies call services, including group services, with respect to the second party. The SIP application server then routes the call request to the terminating S-CSCF server, which forwards the call request to the second party.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    at an application server comprising a communication bus, a memory, and a processor:
        receiving, via the communication bus, a call request initiating a call from a first party to a second party, wherein the call request includes information associated with the first party and information associated with the second party;
        determining, by the processor, whether the first party and the second party are members of a group, wherein determining whether the first party and the second party are members of the group includes analyzing the information associated with the first party and the information associated with the second party to determine whether the first party and the second party are members of the group; and
        in response to determining, by the processor, that the first party and the second party are members of the group, storing data associated with origination processing for a call associated with the call request in a data structure in the memory indexed by a globally unique identifier associated with the call request, wherein the data associated with the origination processing for the call is stored for use in processing a terminating request for the call, wherein the stored data associated with origination processing for a call includes information about a set of services provided to the first party, wherein the terminating request is sent to the application server by a terminating server associated with the second party, wherein processing the terminating request for the call includes providing the set of services to the second party.

2. The method of claim 1, wherein the application server includes a session initiation protocol (SIP) application server.

3. The method of claim 1, wherein the group includes a closed user group.

4. The method of claim 3, wherein parties of the closed user group are provided with predetermined services.

5. The method of claim 1, wherein different sets of services are provided to different groups.

6. The method of claim 5, wherein the services include one or more of private extension dialing, distinctive ringing, an intercom feature, and enhanced telephony features.

7. The method of claim 1, wherein the call is initiated over a network.

8. The method of claim 1, wherein an identifier is assigned to the data.

9. The method of claim 8, wherein the identifier includes a globally unique identifier.

10. The method of claim 8, wherein the identifier is included in a session initiation protocol (SIP) header.

11. The method of claim 1, wherein the stored data is identified in response to a terminating call request.

12. The method of claim 1, wherein the data is utilized to provide group services.

13. The method of claim 1, wherein it is determined whether the first party and the second party are members of the group based on an identifier associated with the first party.

14. The method of claim 1, wherein it is determined whether the first party and the second party are members of the group based on an identifier associated with the second party.

15. The method of claim 1, wherein it is determined whether the first party and the second party are members of the group based on a query of configuration information.

16. The method of claim 15, wherein a local database is queried.

17. The method of claim 15, wherein a remote database is queried.

18. A computer program product embodied on a non-transitory computer readable medium, comprising:
   computer code for receiving a call request initiating a call from a first party to a second party, wherein the call request includes information associated with the first party and information associated with the second party;
   computer code for determining whether the first party and the second party are members of a group, wherein determining whether the first party and the second party are members of the group includes analyzing the information associated with the first party and the information associated with the second party to determine whether the first party and the second party are members of the group; and
   computer code for, in response to determining that the first party and the second party are members of the group, storing data associated with origination processing for a call associated with the call request in a data structure in the memory indexed by a globally unique identifier associated with the call request, wherein the data associated with the origination processing for the call is stored for use in processing a terminating request for the call, wherein the stored data associated with origination processing for a call includes information about a set of services provided to the first party, wherein the terminating request is sent to the application server by a terminating server associated with the second party, wherein processing the terminating request for the call includes providing the set of services to the second party.

19. A system, comprising:
   an application server in communication with a device, the application server comprising:
      a communication bus for receiving, from the device, a call request initiating a call from a first party to a second party, wherein the call request includes information associated with the first party and information associated with the second party;
      a processor for determining whether the first party and the second party are members of a group, wherein determining whether the first party and the second party are members of the group includes analyzing the information associated with the first party and the information associated with the second party to determine whether the first party and the second party are members of the group; and
      a memory for, in response to determining that the first party and the second party are members of the group, storing data associated with origination processing for a call associated with the call request in a data structure in the memory indexed by a globally unique identifier associated with the call request, wherein the data associated with the origination processing for the call is stored for use in processing a terminating request for the call, wherein the stored data associated with origination processing for a call includes information about a set of services provided to the first party, wherein the terminating request is sent to the application server by a terminating server associated with the second party, wherein processing the terminating request for the call includes providing the set of services to the second party.

* * * * *